United States Patent [19]

Roberts

[11] Patent Number: 4,537,280
[45] Date of Patent: * Aug. 27, 1985

[54] EXHAUST EXTENSION PIPE REPLACEMENT KIT

[75] Inventor: Peter Roberts, Mississauga, Canada

[73] Assignee: Thrush Incorporated, Rexdale, Canada

[*] Notice: The portion of the term of this patent subsequent to Apr. 10, 2001 has been disclaimed.

[21] Appl. No.: 592,818

[22] Filed: Mar. 23, 1984

Related U.S. Application Data

[63] Continuation-in-part of Ser. No. 371,230, Apr. 23, 1982, Pat. No. 4,441,579.

[51] Int. Cl.³ .................................................. F01N 7/18
[52] U.S. Cl. .................................. 181/243; 180/309; 206/335; 285/263; 285/331
[58] Field of Search .................... 181/227, 228, 243; 16/110 R, 111 R, 110.5, 114 R, 124, 125; 180/311, 296, 309, 89.2; 190/57, 58 R, 58 A; 206/335, 443; 285/382.2, 261, 263, 399, 331; 294/137, 149, 150, 151, 152, 165, 166

[56] References Cited

U.S. PATENT DOCUMENTS

| 1,949,055 | 2/1934 | Lambie | 285/261 X |
| 2,160,808 | 6/1939 | Bradley | 181/243 X |
| 2,248,234 | 7/1941 | Hichman et al. | 294/137 |
| 2,858,853 | 11/1958 | Lyon | 181/228 |
| 3,002,269 | 10/1961 | Hopkins | 285/261 X |
| 3,263,772 | 8/1966 | Irwin et al. | 181/227 |
| 4,055,287 | 10/1977 | Champenois, Jr. | 294/150 X |
| 4,132,437 | 1/1979 | Green | 285/263 |
| 4,279,326 | 7/1981 | Meineke et al. | 181/228 |

*Primary Examiner*—Benjamin R. Fuller
*Attorney, Agent, or Firm*—Staas & Halsey

[57] ABSTRACT

An exhaust extension pipe kit for replacing original equipment of different size and configuration, where the connector to which the exhaust extension pipe connects is of a ball type and the original equipment have differing ball radii, wherein the exhaust extension pipe is dimensioned to connect to the large diameter ball and an adapter is provided for connecting the smaller diameter ball which is configured as a cup-like body having an opening in the base thereof together with means for restricting the non-axial rotary movement of the adapter.

13 Claims, 4 Drawing Figures

U.S. Patent    Aug. 27, 1985    4,537,280
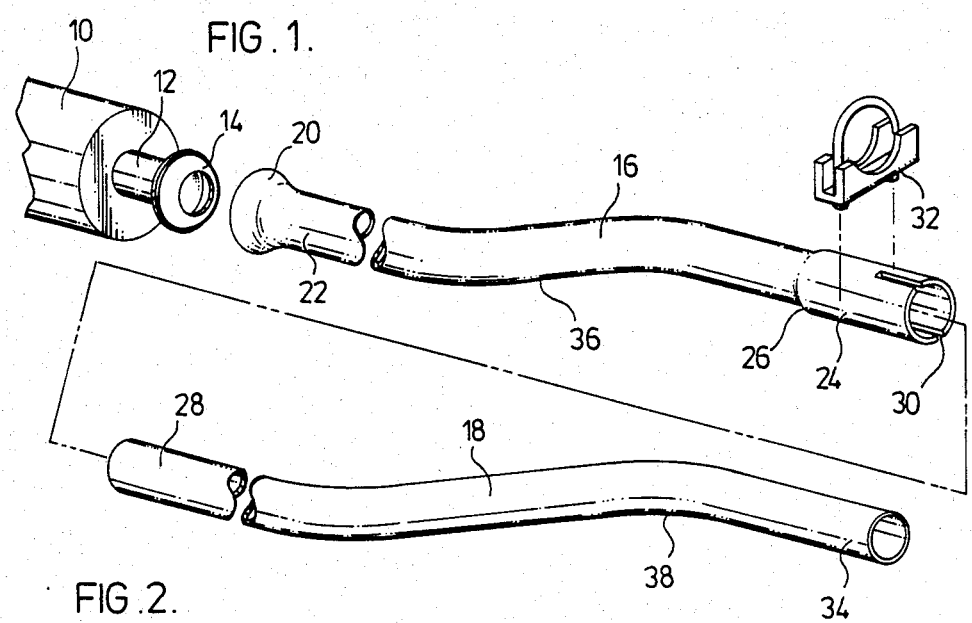
FIG. 1.
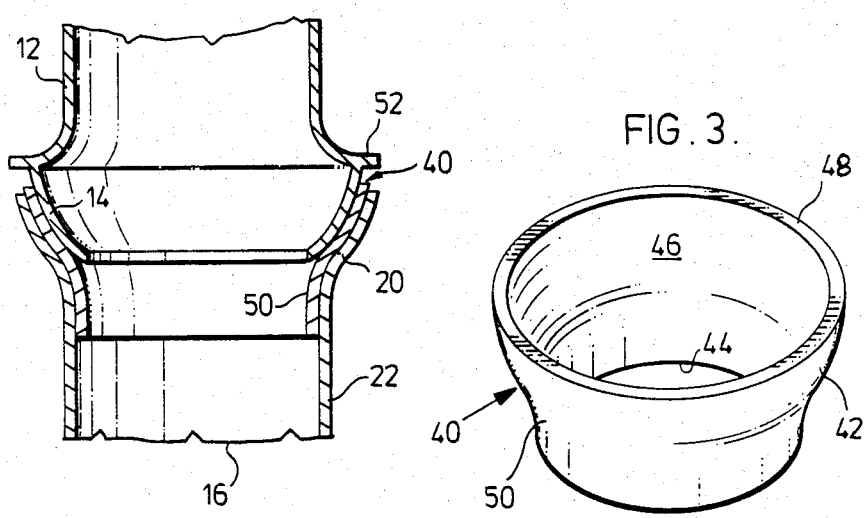
FIG. 2.
FIG. 3.
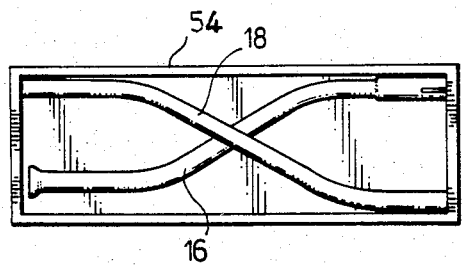
FIG. 4.

EXHAUST EXTENSION PIPE REPLACEMENT KIT

This application is a continuation-in-part of U.S. Pat. Ser. No. 371,230 filed 4/23/82 now U.S. Pat. No. 4,441,579.

FIELD OF INVENTION

This invention relates to automotive vehicles. It particularly relates to the provision of replacement exhaust components thereof, namely the exhaust extension pipe.

BACKGROUND OF THE INVENTION

An automobile exhaust system comprise 3 main components, being the exhaust pipe, muffler and tail pipe. In rear wheel drive vehicles of conventional design the muffler usually located forwardly of the rear axle of the vehicle, and the tail pipe connects to the muffler, arches over the rear axle and extends towards the rear extremity of the vehicle in an elongated spout portion. Some 80 percent of the total market of domestic automobiles and vans currently comprises so called "popular models" which individually enjoy sales significantly greater than those of other models. Of this 80%, or about 65% of the total, require no fewer than about 250 different tail pipe configurations to be stocked for servicing, necessarily resulting in relatively high costs for inventory, floor space and time for stocking and retrieval purposes.

The tail pipes are generally of some 5-7 ft. (2.2-2.5 m) in length, which poses significant difficulty for distribution, particularly by common carriers, where the length may be retricted to about 4-5 ft. Whilst the length of the tail pipes has not seriously inconvenienced trade at the professional installer level, that is to say in muffler shops, it has impeded distribution through mail-order, self-serve and do it yourself outlets. There is moreover, a further impediment to this portion of the trade, due to the difficulty in fitting tail pipes of normal length to an automotive vehicle, this generally necessitating the vehicle being hoisted to provide a ground clearance between the ground and frame of the vehicle appreciably greater than can be obtained using normal bumper jacks or ramps.

The exhaust pipe of an exhaust system generally connects between an exhaust manifold and the muffler. Increasingly, automotive vehicles are being equipped with catalytic converters, which locate intermediate the ends of the exhaust pipe, the portion thereof which connects between the catalytic converter and the muffler being known as the exhaust extension pipe.

Exhaust extension pipes generally have a length somewhat less than that of the tail pipe, but lengths in the range of about 38 to 80 inches are commonly encountered, creating similar problems in distribution to those earlier spoken of. In certain instances the exhaust extension pipe includes an over the axle section, especially where the muffler locates behind the back axle of the vehicle, and problems in introducing a replacement exhaust extension pipe may be encountered when using simple jacks or the like for elevating the vehicle.

The number of differing exhaust pipes required for servicing the popular model vehicles is fewer than that required for servicing the tail pipes spoken of earlier, but it nonetheless results in high inventory costs, wasteful use of floorspace and difficulties of retrieval.

It is an object of the invention to provide exhaust extension pipe kits for the replacement of OEM exhaust extension pipes that are more readily transportable by public carrier and by individuals.

It is a further object of the invention to provide exhaust extension pipe kits which are suitable replacements for a larger number of OEM exhaust extension pipes.

BRIEF DESCRIPTION OF THE INVENTION

In accordance with one aspect of the invention, a replacement exhaust extension pipe kit suitable for use with either a first vehicle that was originally equipped with a first tubular exhaust extension pipe having an inlet end connected to a catalytic converter, an intermediate region of predetermined first configuration, and an outlet end spaced apart from the inlet end by a first distance, or a second vehicle that was originally equipped with a second tubular exhaust extension pipe having an inlet end connected to a catalyic converter, an intermediate region of predetermined second configuration, and an outlet end spaced apart from the inlet end by a second distance, comprises a first tubular section having an inlet end for connecting to the exhaust system of the vehicle, an intermediate portion configured to the spatial envelope of both the first and second configurations, and an outlet end spaced apart from said inlet end by a third distance. The kit further comprises a second tubular section having an inlet end and an outlet end spaced apart from the inlet end by a fourth distance, the second tubular portion having an intermediate portion configured to the spatial envelope of the first and second vehicle, the fourth distance being approximately the same as the third distance and the sum of the third and fourth distances being at least as long as the larger of the first and second distances. The kit includes packaging means for temporarily retaining the first and second tubular sections in overlapping relationship to provide a shipping package substantially shorter than either of said first and second distances; and means permitting the outlet end of said first tubular section to be operatively connected to said inlet end of the second tubular section is gas flow relationship when the replacement tail pipe kit is being permanently installed in one of said first and second vehicles.

By spatial envelope is meant the path taken by the exhaust extension pipe manufactured in accordance with OEM standards for a vehicle, and the free space surrounding that path when the exhaust extension pipe is installed on the vehicle in accordance with OEM standards, the normal operational requirements of the vehicle being taken into consideration, which is to say that due allowance must be made for relative movement between the sprung and unsprung components of the vehicle. Generally speaking it is found that certain models of a particular manufacturer may be related, having overlapping spatial envelopes due to the use of common components and modular construction techniques.

In accordance with another aspect of the invention, where the exhaust extension pipes of the first and second vehicles have differing diameters, the replacement kit therefor is sized in accordance with the larger of the diameters, and an adaptor is provided for connecting the exhaust extension pipe of the kit to the smaller diameter exhaust system.

Where the connector to which the exhaust extension pipe connects is of a ball type, and the first and second vehicles have differing ball radii, the exhaust extension pipe of the kit is dimensioned to connect to the larger diameter ball, and an adapter provided for connecting the smaller diameter ball.

In accordance with another aspect of the invention, the ball adapter comprises a cup like body having an opening in the base thereof, and means for restricting the non-axial rotary movement of the adapter, so as to preclude it from acting as a shutter to restrict the passage of exhaust gas through the connector.

In accordance with another aspect of the invention, a kit for replacing an OEM exhaust extension pipe in an automotive vehicle, the OEM extension pipe being unitary and having a predetermined length, comprises a first tubular section having an inlet end, an intermediate portion having a predetermined configuration, and an outlet end. A second tubular section separate from the first section is provided having an inlet end, an intermediate portion having a predetermined configuration and an outlet end, the second section being approximately as long as the first section. The kit further comprises packaging means for retaining the tubular sections in overlapping relationship in an assembly approximately half as long as the exhaust extension pipe replaced; and means permitting the outlet end of the first tubular section to be operatively connected to the inlet end of the second tubular section in gas flow relationship when the replacement exhaust extension pipe kit is being installed.

Having described the broad features of my invention, specific embodiments thereof will be further discussed from which the general aims, objects and advantages of the invention will become more apparent.

BRIEF DESCRIPTION OF THE DRAWINGS

FIG. 1 shows in schematic, disassembled form an exhaust extension pipe in position for coupling to an upstream exhaust system component;

FIG. 2 shows in enlarged scale a transverse section through a connector joint of the exhaust extension pipe, with an adapter therefor;

FIG. 3 shows in perspective view the adaptor of FIG. 2, and

FIG. 4 shows in schematic plan form an exhaust extension pipe in packaged kit form.

DESCRIPTION OF THE PREFERRED EMBODIMENT

Referring to the drawings in detail, a partial exhaust system for an automobile vehicle comprises a catalytic converter 10 having an outlet tube 12 terminating in ball connector 14, and a two part exhaust extension pipe comprising first and second sections 16,18. First section 16 has a socket 20 formed at the inlet end 22 thereof, for connecting to ball connector 14 either directly or indirectly as will be referred to subsequently in greater detail. The outlet end 24 of first section 16 is expanded at 26, so as to receive the inlet end 28 of second section 18 therein in telescopic relationship. End 24 may be slit at 30 along part of its length, to facilitate the introduction and securement of telescoping end 28 therein in known manner. Desirably, the axial length of the expanded end portion at 26 may be some 10 to 12 inches, so as to permit a facile adjustment of the overall axial length of the exhaust extension pipe according to the penetration of the inlet end 28 of the second section therein. It will be appreciated that for this purpose, the mating portions of the first and second sections will be linear. A clamp 32 is provided for locking the two sections 16,18 into a unitary structure. The outlet end 34 of second section 18 normally connects telescopically into a socket of a muffler (not illustrated), and for this reason outlet end 34 will normally be linear.

While in certain automotive vehicles the outlet tube 12 of the converter and the inlet tube of a muffler to which the exhaust extension pipe connect may be collinear, generally speaking the converter outlet and muffler inlet will be offset in one or more planes. For this purpose the first and second sections 16,18 have intermediate portions identified respectively as 36,38, which may be non-linear. These intermediate portions are configured to conform to the spatial envelope set for vehicles for which the kit is intended. It will be appreciated that by rotating one section relative to the other, the overall configuration of the integrated structure may be varied in those instances where one or both of the intermediate portions have an angular configuration, whereby the kit is suited for use with a plurality of vehicles of a group. The actual selection of desirable configurations of sections 16,18 is generally arrived at by an iterative process, wherein the OEM routings for exhaust extension pipes of a family of vehicles having, or suspected of having, a similar routing are compared. Trial first and second sections 16,18 are conformed to the closest pair of OEM exhaust extension pipe routings, and modified to include the routing of a third vehicle, et cetera.

The axial lengths of the first and second sections 16,18 are desirably approximately equal, thereby facilitating package and transport, and in some instances installation of the exhaust extension pipe. However, the axial lengths of the first and second sections will be to a certain extent influenced by a desire to provide a coupling zone between the sections, which is to say in regard to the instant embodiment, the outlet 24 of the first section and the inlet 28 of the second section, which are of extended linear dimension, so as to permit the telescopic adjustment of the overall axial length of the combined sections as earlier spoken of. Further adjustment is also possible simply by the use of a hacksaw to reduce the axial length of inlet end 28 of the second section. Still further adjustment may in suitable instances by made by adjusting the length of the outlet end 34 of the second section 18 with a hacksaw, for which purpose it is also desirable that the outlet end 34 of the second section 18 be linear over an extended length.

The spherical radius of the ball connector 14 of the catalytic converter 10 may vary between different vehicle models for which the exhaust extension pipe kit is otherwise suited. In order that the exhaust extension pipe kit by of utility for use with all of the vehicles of the group, the socket connector 20 of the first section 16 is sized in accordance with the maximum spherical radius of ball connectors of vehicles of the group, and an adaptor 40 is employed to permit the socket connector to couple to ball connectors of reduced spherical diameter. Adaptor 40 is formed with a cup like body portion 42 having an opening 44 in the base thereof to permit the passage of exhaust gases therethrough. The interior wall 46 of cup 42 is formed with a spherical radius equal to that of the ball converter to be coupled, and the exterior wall 48 of the cup has a spherical radius equal to that of socket connector 20. Adaptor 40 has an annular wall 50 which surrounds opening 44 and which projects outwardly from cup 42, the external diameter of wall 50 being such that it provides an interference fit with the interior wall of first section 16. Annular wall 50 serves to preclude the rotation of adaptor 40 in socket 20 in non-axial directions, whereby the adapter cannot accidentally form a shutter for closing the exhaust gas opening in the socket connector.

The axial height of the cup portion 42 of adaptor 40 is expediently limited to about 60% of the spherical radius thereof, although this relationship is not critical. This permits the exhaust extension pipe to be somewhat canted relative to the axis of the outlet tube 12 of the catalytic converter, thereby increasing still further the spatial envelope that the exhaust extension pipe kit can cover. Excessive canting of the exhaust extension pipe will normally be prevented by a ledge 52 surrounding ball connector 14, which interferes with the rim of socket 20 or of adaptor 40, when it is employed.

The exhaust extension pipe kit may be packaged in any suitable manner for distribution, for example by securing the first and second portions together in overlapping relationship by taping and the various accessories such as adapters and clamps being contained in any convenient manner also taped to the tube portions, or otherwise secured thereto in any convenient manner. Alternatively a simple rectangular prismatic box structure 54, as illustrated somewhat schematically in FIG. 4 will be provided to retain the first and second portions in overlapping relationship, and to retain the various clamps such as 32 and adapters such as 40 comprising the kit.

I claim:

1. A replacement exhaust extension pipe kit suitable for use with either a first vehicle that was originally equipped with a first tubular exhaust extension pipe having an inlet end connected to a catalytic converter, an intermediate region of predetermined first configuration, and an outlet end spaced apart from the inlet end by a first distance, or a second vehicle that was originally equipped with a second tubular exhaust extension pipe having an inlet end connected to a catalytic converter, an intermediate region of predetermined second configuration, and an outlet end spaced apart from the inlet end by a second distance, said kit comprising:
    a first tubular section having an inlet end for connecting to the catalytic converter, an intermediate portion configured to the spatial envelope of both the first and second configurations, and an outlet end spaced apart from said inlet end by a third distance;
    a second tubular section having an inlet end and an outlet end spaced apart from the inlet end by a fourth distance, said second tubular portion having an intermediate portion configured to the spatial envelope of the first and second vehicle, the fourth distance being approximately the same as the third distance and the sum of the third and fourth distances being at least as long as the larger of the first and second distances;
    packaging means for temporarily retaining the first and second tubular sections in overlapping relationship to provide a shipping package substantially shorter than either of said first and second distances; and
    means permitting said outlet end of said first tubular section to be operatively connected to said inlet end of said second tubular section is gas flow relationship when said replacement tail pipe kit is being permanently installed in one of said first and second vehicles.

2. A replacement exhaust pipe kit as defined in claim 1, wherein said means for permitting said outlet end of said first tubular section to be operatively connected to the inlet end of said second tubular section comprises a telescopic joint.

3. A replacement exhaust pipe kit as defined in claim 1, wherein said exhaust extension pipes of said first and second vehicles have different inlet diameters, and wherein the inlet end of at least the first tubular section of said replacement kit has a diameter equal to the larger inlet diameter of said extension pipes.

4. A replacement exhaust pipe kit as defined in claim 1, wherein said catalytic converter terminates in a ball outlet connector and wherein the inlet end of said first tubular section has a socket connector to connect to the ball outlet connector of the catalytic converter.

5. A replacement exhaust pipe kit as defined in claim 4, wherein the ball outlet connector of said first vehicle has a different spherical radius than the ball outlet connector of said second vehicle, and the socket connector of said first tubular section has a spherical radius equal to the larger of the two ball radii.

6. A replacement exhaust pipe kit as defined in claim 5, wherein said kit further comprises a cup adaptor for insertion into the socket connector to effectively reduce the spherical radius thereof to that of the smaller of said ball radii.

7. A kit for replacing an OEM exhaust extension pipe in an automotive vehicle, the OEM extension pipe being unitary and having a predetermined length, comprising:
    a first tubular section having an inlet end, an intermediate portion having a predetermined configuration, and an outlet end;
    a second tubular section separate from said first section and having an inlet end, an intermediate portion having a predetermined configuration and an outlet end, the second section being approximately as long as the first section;
    packaging means for retaining said tubular sections in overlapping relationship in an assembly approximately half as long as the exhaust extension pipe replaced; and
    means permitting said outlet end of said first tubular section to be operatively connected to said inlet end of said second tubular section is gas flow relationship when said replacement exhaust extension pipe kit is being installed.

8. A replacement exhaust extension pipe kit as in claim 7, wherein said means permitting said outlet end of said first tubular section to be operatively connected to said inlet end of said second tubular section comprises a telescopic mounting for said outlet end of said first tubular section and said inlet end of said second tubular section.

9. A replacement exhaust extension pipe kit as in claim 7, wherein said means permitting said outlet end of said first tubular section to be operatively connected to said inlet end of said second tubular section comprises said outlet end of said first tubular section being expanded in diameter while said inlet end of said second tubular section being of the same diameter as the remaining portions thereof, thus permitting said inlet end of said second tubular section to be telescopically connected to said outlet end of said first tubular section, while also permitting said second tubular section to be cut in the vicinity of said inlet end thereof when a shorter length is desired.

10. A replacement exhaust extension pipe kit as in claim 9, wherein said outlet end of said first tubular section includes a slit permitting said outlet end of said first tubular section to be more readily constricted so as to tighten same about said inlet end of said second tubular section.

11. A replacement exhaust extension pipe kit as in claim 9, further comprising a clamp for surrounding said outlet end of said first tubular section for tightening same about said inlet end of said second tubular section.

12. A replacement exhaust extension pipe kit as in claim 7, further comprising hardware for connecting said exhaust extension pipe kit to the automotive vehicle, and means packaging said hardware with said first and second tubular sections.

13. An improved replacement exhaust extension pipe of the type wherein an elongated tubular element is provided with an inlet end for connection to the catalytic convertor of a vehicle, an outlet end for connecting to other tubular elements of the exhaust system of said vehicle and an intermediate region between the inlet and outlet ends for extending beneath the vehicle through a passage of predetermined minimum configuration, wherein the improvement comprises:
 kit means for replacing the exhaust extension pipe of either of said vehicle and another vehicle that was originally equipped with an exhaust extension pipe having a different length from inlet to outlet ends and having an intermediate region configured to extend through a passage having a different predetermined minimum configuration, said kit means including:
 a tubular element having a first end for connection to the catalytic convertor of either of said vehicle and another vehicle, and a second end axially spaced from said first end; and
 tubular means for coupling with the second end of the tubular element to complete an exhaust extension pipe for either of said vehicle and another vehicle, said tubular element and said tubular means when coupled together having a length at least as great as the longer of the exhaust extension pipes with which said vehicle and another vehicle were originally equipped;
 at least one of said tubular element and said tubular means being manually shortenable;
 at least one of said tubular element and said tubular means including a non-linear portion intermediate the ends thereof;
 whereby relative rotation of said tubular element and said tubular means about the coupling therebetween will generate a plurality of spatial envelopes to permit said exhaust extension pipe kit to be employed as a replacement for a plurality of OEM exhaust extension pipes having differing OEM spatial envelopes.

* * * * *